United States Patent [19]

Wang

[11] Patent Number: 5,029,490
[45] Date of Patent: Jul. 9, 1991

[54] VEHICLE REAR WINDOW SUN BLIND DEVICE WITH DOUBLE-END MOUNTING ANGLE ADJUSTING MECHANISM

[76] Inventor: Jing S. Wang, No. 174, Lane 131, Sec. 2, True Hsing Rd., Panchiao, Taipei, Taiwan

[21] Appl. No.: 551,546
[22] Filed: Jul. 11, 1990
[51] Int. Cl.5 .............................................. G05G 5/06
[52] U.S. Cl. ........................................ 74/529; 74/527
[58] Field of Search ................... 74/557, 523, 527, 528

[56] References Cited

U.S. PATENT DOCUMENTS

| | | | |
|---|---|---|---|
| 4,567,692 | 2/1986 | Vogt et al. | 74/557 X |
| 4,770,057 | 9/1988 | Foggini | 74/523 |
| 4,833,938 | 5/1989 | Reinwall et al. | 74/527 X |
| 4,840,083 | 6/1989 | Hagan et al. | 74/527 X |
| 4,895,042 | 1/1990 | Wang | 74/523 |

*Primary Examiner*—Vinh T. Luong
*Attorney, Agent, or Firm*—Bucknam and Archer

[57] ABSTRACT

A vehicle rear window sun blind device with double-end mounting angle adjusting mechanism, which includes a base having a plurality of teeth on the bottom for mounting on a vehicle rear panel, a toothed lug at the top for the connection thereto of the toothed connector to hold a rod support and a mounting block, a plurality of normally horizontally extending pairs of mounting holes at the front for the fastening therein of two projections a reel holder to hold a sun blind reel. The blind has a fastening element pulled to fasten in a T-shaped retainer hole on the mounting block so as to set up the sun blind to protect against sunlight. By changing the engaged position of the connector to the lug and the T-shaped projections of the reel holder in the mounting holes of the base, the mounting angle of the sun blind is conveniently adjusted.

2 Claims, 1 Drawing Sheet

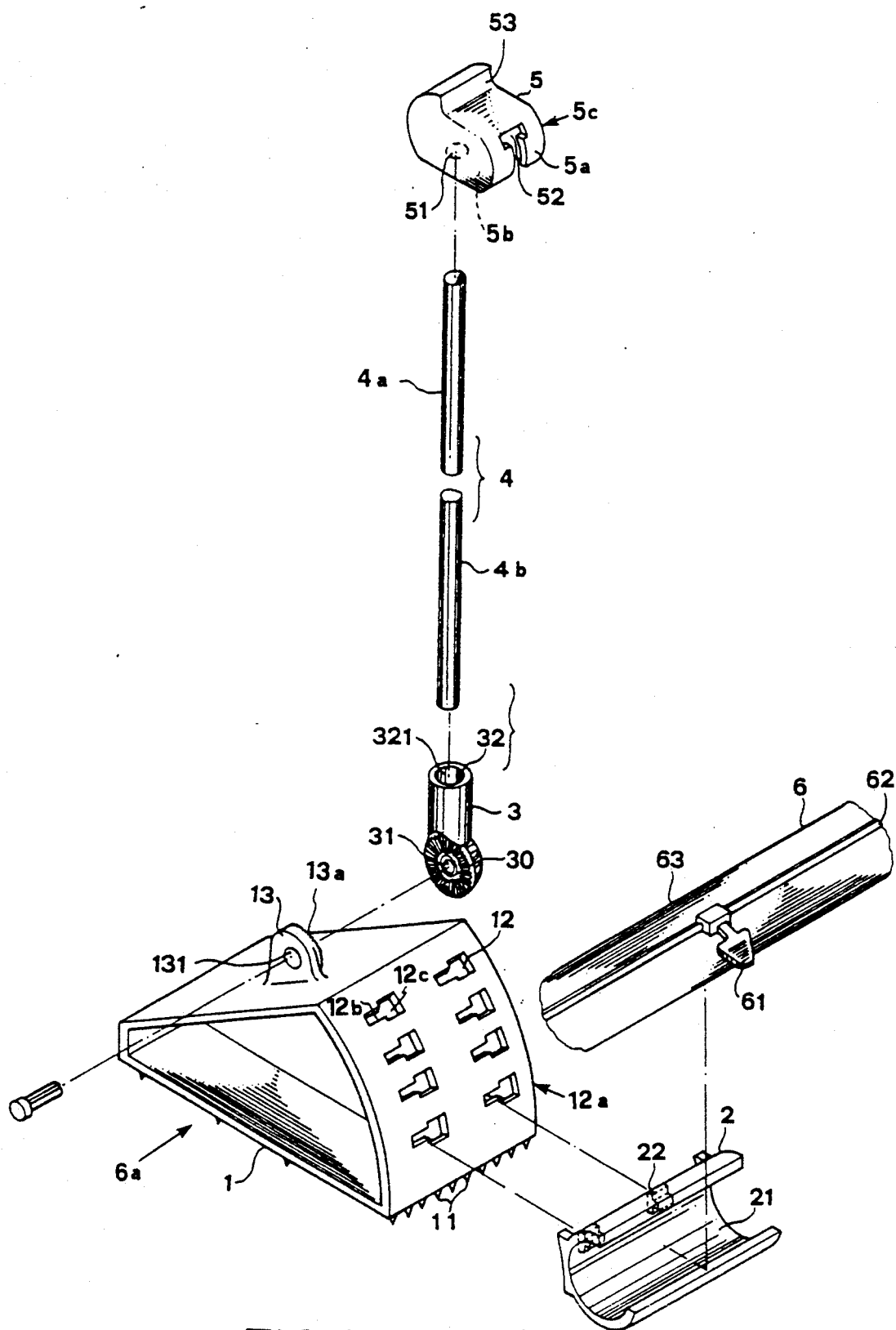
FIG:1

VEHICLE REAR WINDOW SUN BLIND DEVICE WITH DOUBLE-END MOUNTING ANGLE ADJUSTING MECHANISM

BACKGROUND OF THE INVENTION

1. Field of the Invention

The present invention relates to automobile sun blinds and more particularly to a sun blind for the rear window of an automobile which can be conveniently adjusted to a mounting position according to the angle of inclination of a rear window.

2. Description of the Prior Art

In recent years, because of the economical, industrial and business prosperity people's livelihood has been greatly improved, and private cars have become so popular, a vehicle is generally equipped with an internal ventilation system and air-conditioning system to make people sitting therein comfortably. However, the installation of a vehicle internal ventilation of air-conditioning system can not protect people against direct sunlight. The use of sunlight shielding film or paper may darken the internal space of a vehicle and will obstruct the sense of beauty of a vehicle. After a certain period of time in use, a sunlight shielding film or paper may be stripped from a car window easily due to the effect of direct sunlight. Recently, a variety of detachable sun blind devices have been developed for use in a vehicle to protect the occupants against sunlight. The common disadvantage of regular vehicle sun blinds is that a sun blind can not be stably mounted in position or conveniently adjusted to a desired mounting angle according to the slope of a vehicle rear window.

SUMMARY OF THE INVENTION

The present invention has been accomplished under the circumstances in view. It is one object of the present invention to provide a vehicle rear window sun blind device which can be conveniently adjusted to a desired angle according to the slope of a vehicle rear window.

Another object of the present invention is to provide a vehicle rear window sun blind device which can be conveniently stably fastened inside a vehicle to protect against direct sunlight through a vehicle rear window.

BRIEF DESCRIPTION OF THE DRAWINGS

FIG. 1 the sole drawings is a perspective fragmentary view of the present invention.

DETAILED DESCRIPTION OF THE PREFERRED EMBODIMENT

Turning now to the annexed drawing in greater detail, therein illustrated is an automobile rear window sun blind device embodying the present invention and generally comprised of a base 1, a reel holder 2, a connector 3, a rod support 4, a mounting block 5 and a sun blind reel 6.

The base 1 is formed of a sector body 6a having a plurality of lines of teeth 11 on the bottom conveniently disposed for fastening in the velvet cover of an automobile internal rear panel, a plurality of normally horizontally extending pairs of mounting holes 12 on its front arch-shaped wall 12a for mounting the reel holder 2, which mounting holes 12 are each formed of a narrower opening 12b at one end and a wider opening 12c at an opposite end, a lug 13 on its sloping top wall for mounting the connector 3, which lug 13 has a toothed side wall surface 13a at one side and defines therein a threaded hole 131.

The reel holder 2 is an elongated, tubular member defining axially therein an opened channel 21 in size corresponding to the outer diameter of the sun blind reel 6 so that the sun blind reel 6 can be inserted therein. Two T-shaped projections 22 are made on the outer wall surface of the reel holder 2 and respectively designed in size corresponding to the mounting holes 12 of the base 1. After having been inserted in either part of mounting holes 12, the two T-shaped projections 22 are horizontally moved leftward permitting the reel holder 2 to be firmly secured to the base 1.

The connector 3 comprises a toothed side wall portion 30 defining therein a threaded hole 31 corresponding to the threaded hole 131 of the lug 13 for mounting, and an unitary sleeve portion 32 upstanding therefrom and defining therein a bore 321 suitable for the insertion therein of the rod support 4.

The rod support 4 has an outer diameter made according to the inner diameter of the sleeve portion 32. According to the present invention the rod support 4 can be designed in a (non-illustrated) telescopic structure or formed of a plurality of segments, such as 4a detachably connected in series.

The mounting block 5 has a curved outer surface 5a and a flat bottom 5b defining therein a hole 51 on the bottom for the insertion therein of the rod support 4, it further has a T-shaped retainer hole 52 at the front 5c for holding the front fastening element 61 of the sun blind reel 6, and a top projecting portion 53 for fastening in a (non-illustrated) top channel of an automobile rear window.

The sun blind reel 6 is a product of the known art, which includes a housing 63 provide with a mechanism to let down or automatically take up a blind 62 which has a front fastening element 61 attached thereto and is always disposed out of the housing 63. The housing 63 is designed in size suitable for mounting in the channel 21 of the reel holder 2.

The process for mounting the sun blind device of the present invention inside an automobile is outlined hereinafter. After the base 1 is mounted on the (non-illustrated) rear panel near the rear window of an automobile, the connector 3 is fixedly secured to the lug 13 of the base 1 with the toothed side wall portion of the connector 3 engaged with the toothed side wall surface 13a of the lug 13 permitting fastening means such as screw to be mounted in the threaded holes 131, 31 to adjustably secure the connector 3 to the lug 13 at an an angle of inclination according to the slope of an automobile rear window. Then, the T-shaped projections 22 of the reel holder 2 are secured in one pair of the mounting holes 12 on the base 1 respectively aligned with the T-shaped portions 22 according to desired angle of inclination. After the mounting block 5 is attached to the (non-illustrated) internal top channel above the rear window of the automobile and simultaneously mounted on the top of the rod support 4, the rod support 4 is firmly arrested between the mounting block 5 and the base 1. After the fastening element 61 is pulled outwardly so as to be secured to the T-shaped retainer hole 52 of the mounting block, the blind 62 is set up to protect against sunlight which streams through the rear window.

When the connector 3 is rotated to be inclined forwardly and is fixedly secured to or engaged with the lug 13, and when the two T-shaped projections 22 of the reel holder 2 are engaged with the lower pair of mounting holes 12, the blind 62 hangs on the mounting block 5 at a greater angle of inclination. Therefore, the mounting angle of the blind 62 can be alternatively adjusted through the connector 3 or the reel holder 2, or simultaneously adjusted through both the connector 3 and the reel holder 2 according to the requirement of the user.

As described above, the mounting angle of the blind can be conveniently adjusted through the connector 3 and the reel holder 2. Because of the special connecting methods between the connector 3 and the lug 13 of the base 1, the reel holder 2 and the mounting hole 12 of the base 1, the blind 62 can be firmly secured in a mounting position to effectively protect against sunlight and no noise is produced during driving.

The foregoing drawing and description are for the purpose of illustration only and not intended as a definition of the limits and scope of the invention disclosed. Recognizing that various modifications are apparent the scope herein shall be deemed as defined in the claims set forth hereinafter.

I claim:

1. A vehicle rear window sun blind device, comprising:

a base formed of a sector body, and having a plurality of lines of teeth on the bottom thereof, a plurality of pairs of mounting holes on the front arc-shaped wall thereof, said mounting holes being each formed of a narrower opening at one end, and a wider opening at an end opposite to said one end, and a lug on a sloping top wall of said sector body having a connector mounted thereon, said lug having a toothed side wall surface at one side thereof, and defining in said lug a threaded hole;

a reel holder defining axially therein an opened channel and having two T-shaped projections on the back thereof fastened in any normally horizontally extending pair of said mounting holes which are aligned with said T-shaped projections, respectively, said connector comprising a toothed side wall portion defining therein a threaded hole, respectively corresponding to the toothed sidewall portion and the threaded hole of said lug for adjustably fastening said connector to said lug, and a unitary sleeve portion upstanding from said connector, and defining therein a bore;

an elongated rod support designed to have an outer diameter suitable for fastening in said bore of said sleeve portion;

a mounting block having a hole on the bottom thereof for the insertion therein of said rod support, having a T-shaped retainer hole at the front thereof, and having a top projecting portion adapted to be fastened to an automobile window;

a sun blind reel retained in said channel of said reel holder, including a housing having a mechanism to let down or automatically take up a blind, said blind having a front fastening element attached thereto, and being releasably pullable to fasten in said T-shaped retainer hole of said mounting block;

whereby said blind can be hung on said mounting block at a mounting angle adjustable by changing respective engaged positions of said connector to said lug, and of said T-shaped projections of said reel holder in said mounting holes of said base.

2. The vehicle rear window sun blind device of claim 1, wherein said rod support can be designed in a telescopic structure or formed of a plurality of segments detachably connected in series.

* * * * *